June 1, 1965
E. H. BORN ETAL
3,187,250
FREQUENCY CONTROL SYSTEM FOR A.C. GENERATING APPARATUS
Filed Sept. 11, 1961
5 Sheets-Sheet 3
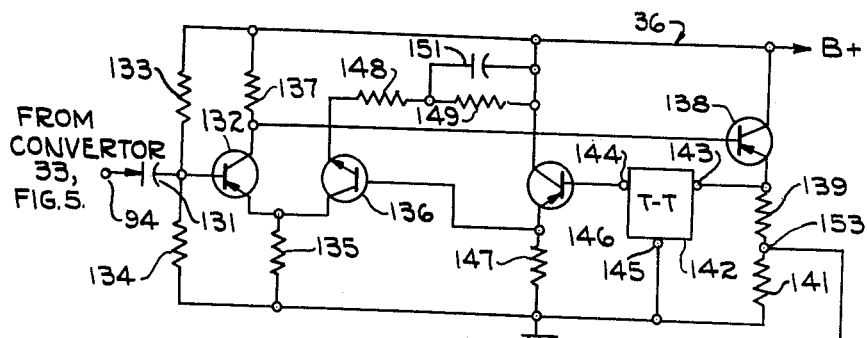
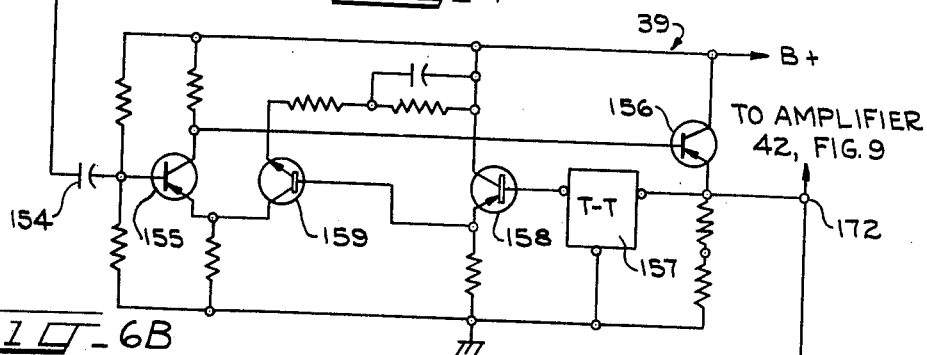
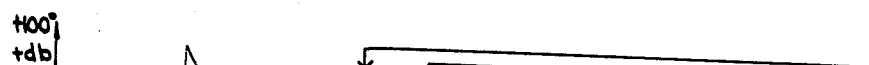
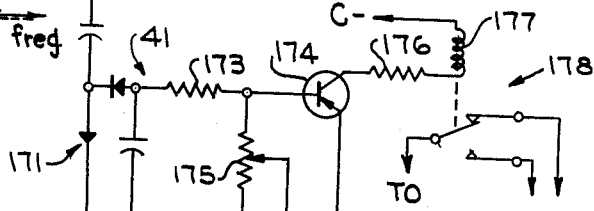
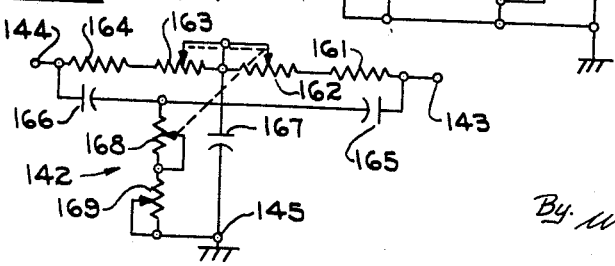
INVENTORS.
ELLIS H. BORN
RICHARD E. PORTER
PAUL B. WOLFE
By Wallace, Kinzer & Horn

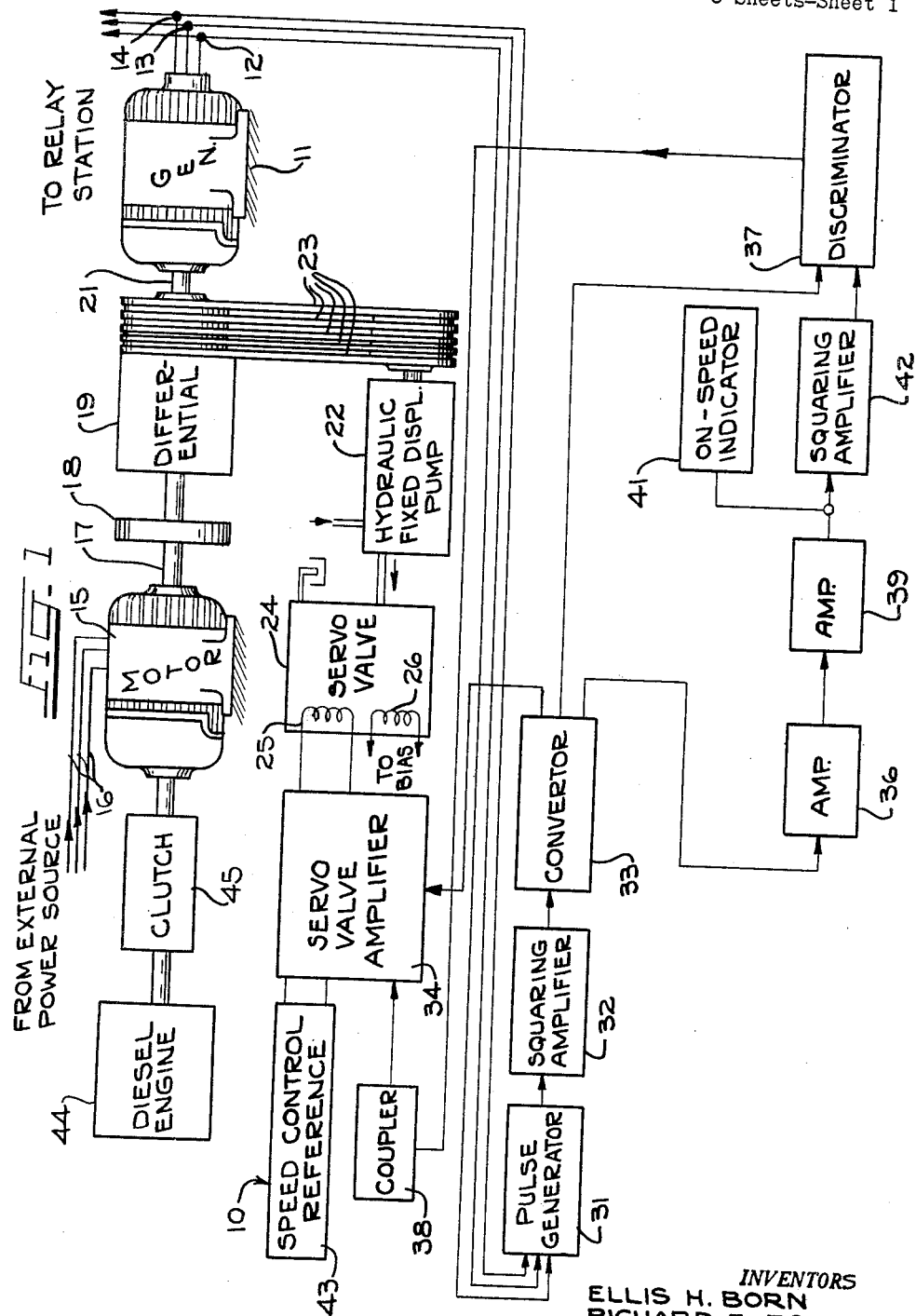

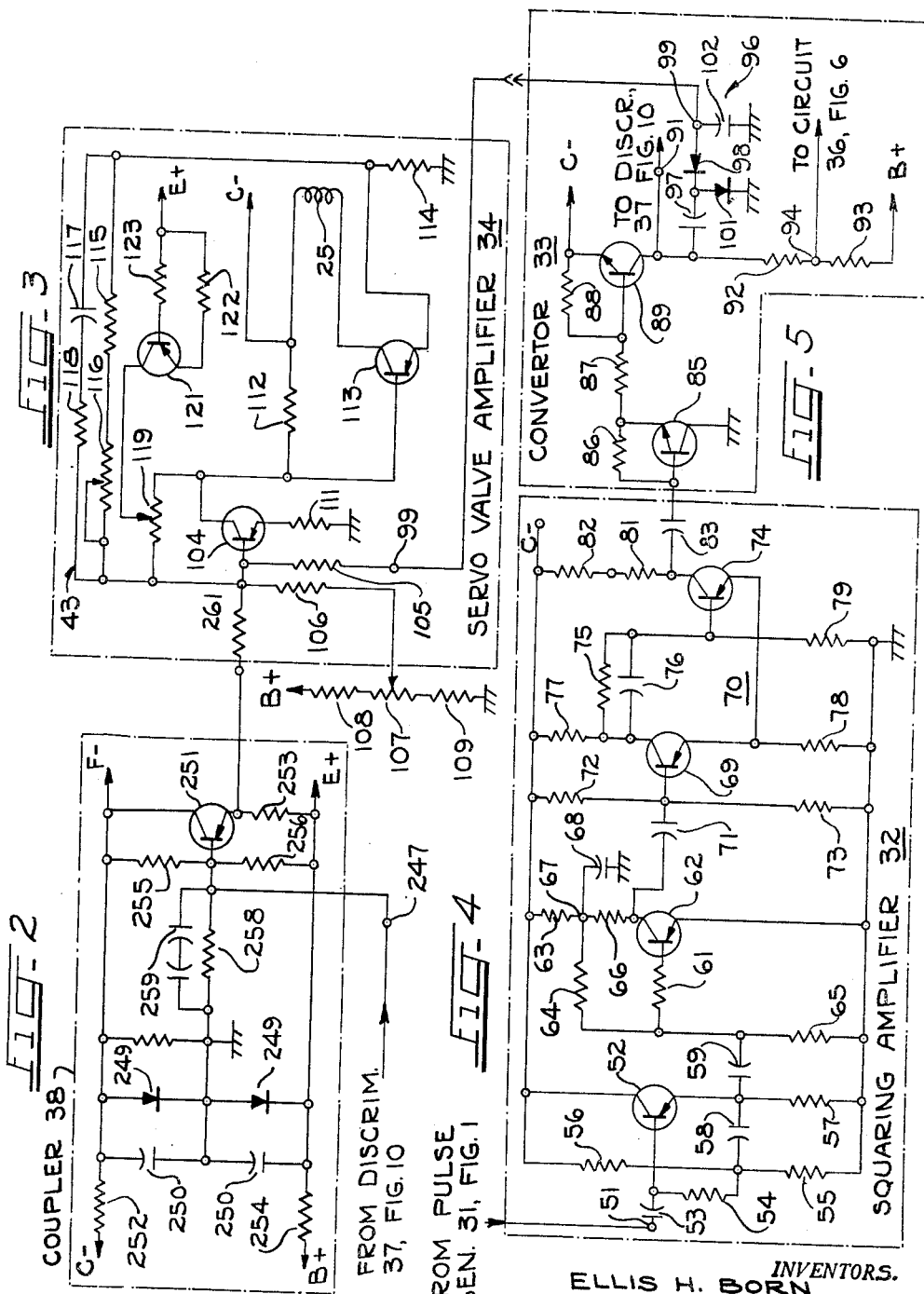

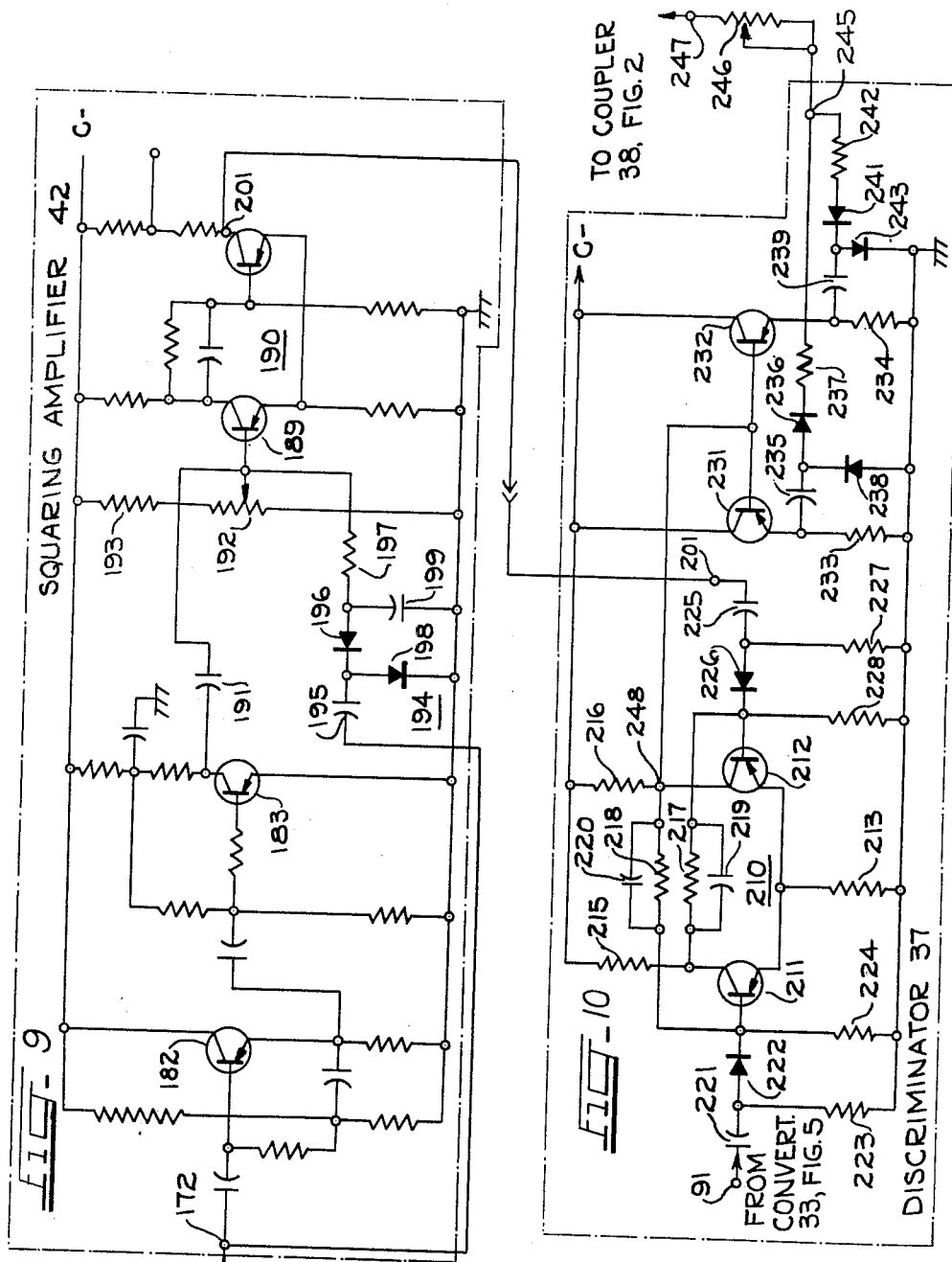

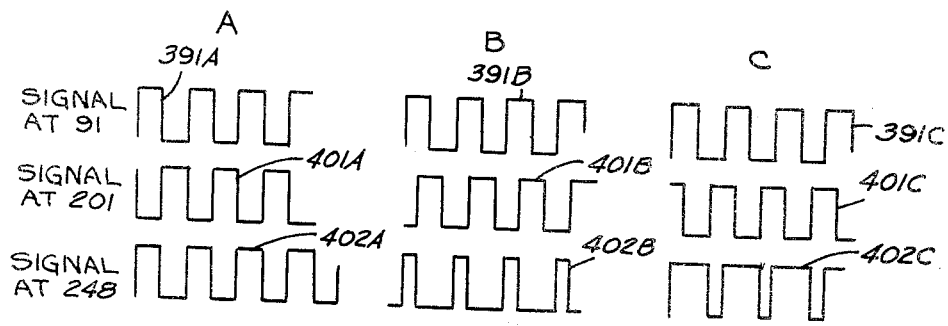
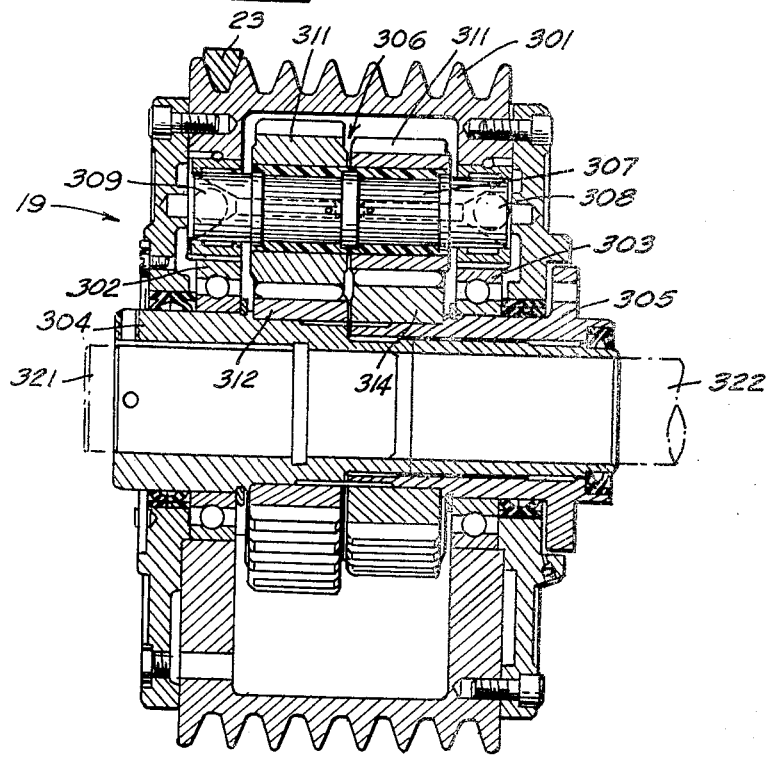

United States Patent Office 3,187,250
Patented June 1, 1965

3,187,250
FREQUENCY CONTROL SYSTEM FOR A.C. GENERATING APPARATUS
Ellis H. Born and Richard E. Porter, Columbus, and Paul B. Wolfe, Dublin, Ohio, assignors to American Brake Shoe Company, New York, N.Y., a corporation of Delaware
Filed Sept. 11, 1961, Ser. No. 137,256
6 Claims. (Cl. 322—32)

This invention relates to a new and improved frequency control system for an A.C. generator and more particularly to a control system suitable for use in microwave relay stations and in other applications where the generator must operate without human supervision.

Modern communications networks are in many instances based upon the use of unattended relay stations. One critical problem presented in connection with stations of this kind has to do with the power supply, and particularly the operating frequency of the power supply. The principal communications equipment used at the station is in many instances constructed for use only with an A.C. power supply operating at a given frequency, and substantial variations from the design frequency for the power supply, usually sixty cycles per second, may well cause substantial errors in operation of the communication devices. On the other hand, although electrical power may be available at many of the remote locations where installations of this kind are required, the available power may fluctuate to a substantial extent both with respect to voltage and frequency. Consequently, it is necessary to provide a complete local self-contained power supply capable of generating a sixty-cycle power output and effective to maintain the output closely and accurately to the sixty-cycle value.

It is a principal object of the present invention, therefore, to provide a new and improved frequency control system for an A.C. generating apparatus that is highly accurate in operation yet requires little or no maintenance and, accordingly, can be incorporated in an unattended communication station or other environment where maintenance is not available.

Another object of the invention is the provision of a relatively simple and inexpensive yet highly precise control system for regulating the frequency of an A.C. generator by controlling the rotational speed of the generator without requiring control over the prime mover for the generator.

An additional object of the invention is to provide a new and improved frequency control system for an alternating current generator that effectively regulates the speed of the generator by controlled regulation of the load on a hydraulic pump that is driven from the same source as the generator.

An additional object of the invention is to provide highly accurate and effective frequency control for an A.C. generator that includes both a basic or coarse frequency control and a trimmer or fine control and which operates substantially independently of the prime mover for the A.C. generator, permitting substitution of different prime movers without changing operation of the control system.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a schematic block diagram of a frequency control system for an A.C. generator, constructed in accordance with one embodiment of the present invention;

FIG. 2 is a detail circuit drawing of a coupling circuit employed in the embodiment of FIG. 1;

FIG. 3 illustrates an amplifier circuit employed in the frequency control system of FIG. 1;

FIG. 4 is a detail circuit diagram of another amplifier circuit utilized in the system of FIG. 1;

FIG. 5 is a detail circuit diagram of a converter circuit employed in the control system;

FIGS. 6 and 7 illustrate substantially similar frequency-selective amplifiers incorporated in the system of FIG. 1;

FIG. 6A is a detail illustration of a filter circuit employed in the devices of FIGS. 6 and 7;

FIG. 6B illustrates the operating characteristics of the filter;

FIG. 8 is an indicator circuit incorporated in the frequency control system of FIG. 1;

FIG. 9 illustrates a further amplifier circuit employed in the system;

FIG. 10 is a detailed circuit drawing of a discriminator circuit incorporated in the frequency control system;

FIG. 11 is an explanatory diagram employed to illustrate certain operating characteristics of the discriminator; and FIG. 12 is a longitudinal sectional view of a variable ratio transmission incorporated in the frequency control system of FIG. 1.

FIG. 1 illustrates a frequency control system 10 constructed in accordance with the present invention and utilized to control the output frequency of an A.C. generator 11. The A.C. generator may be of conventional construction and includes three output terminals 12, 13 and 14 affording a source of three-phase power for a microwave relay station or other utilization apparatus. The prime mover for the generator 11 comprises an electric motor 15 energized through the power lines 16 from some external source. The external source may be a locally accessible transmission line of some kind which is subject to substantial fluctuations in voltage or frequency. Thus, if the motor 15 is an induction motor, the speed thereof may vary to a substantial extent with changes in the input frequency and voltage; if a synchronous motor is employed, the speed may still vary due to changes in the power input frequency.

The motor 15 is provided with an operating shaft 17 that carries a flywheel 18 and is connected to a differential transmission 19. The device 19 is a variable-ratio transmission having an output shaft 21 that is connected to the generator 11. The transmission 19 also is connected in mechanical driving relationship to a fixed displacement hydraulic pump 22 by means of a plurality of drive belts 23.

The hydraulic pump 22 is not utilized to drive the generator 11 or any other working part of the control system. Instead, it operates to pump hydraulic fluid from a reservoir (not shown) through an electrically actuated servo control valve 24 that serves to restrict the output of the pump, and back to the reservoir. Opening and closing of the servo valve, or rather adjustment of the operating aperture in the servo valve, serves to determine the work done by the pump 22 and accordingly serves to modify the load applied to the variable-ratio transmission 19 through the drive belts 23. The actuating and control portion of the valve 24 comprises a main operating solenoid 25 and a bias coil 26, the latter being connected to a source of constant D.C. excitation.

The principal speed control for the generator 11, and thus the main frequency control for the generator, begins with a pulse generator 31 that is connected to the output terminals 12–14 of the generator. The pulse generator 31 may be generally conventional in form and comprises primarily a rectifier circuit for developing a series of unipotential pulses occurring at the operating frequency of the generator 11. If only one phase of the generator 11 were monitored for control purposes, this operating frequency would be sixty cycles per second, assuming this to be the desired output frequency for the generator. In the preferred system described hereinafter, however, a three-phase rectifying circuit is preferably employed, producing a pulse signal at the output of the circuit 31 that has a nominal frequency of one hundred-eighty cycles per second.

The pulse generator 31 is coupled to a squaring amplifier 32 which, in turn, is connected to a converter circuit 33. The converter circuit, described in detail hereinafter in connection with FIG. 5, produces an output signal comprising a series of pulses having a frequency determined by and preferably equal to the input frequency of the signals from the squaring amplifier 32. Moreover, the converter 33 also develops an output signal having an amplitude directly proportional to the input signal frequency. The output signals from the converter 33 are supplied to three different operating circuits of the system. Thus, the converter is coupled to a servo valve amplifier 34, providing an input signal utilized to actuate the main winding 25 of the valve 24. The converter output is further coupled to a frequency-selective amplifier 36 and to a discriminator circuit 37. The circuits 36 and 37 afford a secondary or trim control for the amplifier 34, the output of the discriminator 37 being coupled to the servo valve amplifier through a coupling circuit 38.

The fine or trim control comprising the amplifier 36 and the discriminator 37 also includes a second frequency-selective amplifier 39 that is connected to the output of the amplifier 36. The two amplifiers may be essentially similar in construction as shown by FIGS. 6 and 7. The amplifier 39, in turn, is connected to a squaring amplifier 42 that is generally similar to the amplifier 32. The output of the amplifier 42 is connected to the discriminator 37 to afford a second input signal to the discriminator that is compared with the output from the converter 33, as described more fully hereinafter. The amplifier 39 may also be connected to an on-speed indicator circuit 41 to afford a positive indication when the generator 11 is operating within the permissible speed range of the system.

It is necessary to provide some means of setting the operating speed for the generator, which determines the frequency of the output signal from the generator. In the frequency control system 10 this means is provided by a speed control reference circuit 43 that is connected to and forms a part of the servo valve amplifier 34. Of course, a suitable power supply is provided for the control system 10 but has been omitted from the drawings because any suitable regulated supply circuit may be incorporated in the system as desired. In addition, it may be necessary or desirable to provide an auxiliary prime mover to take the place of the motor 15 in the event of failure of the external power of the electrical power source. The auxiliary prime mover may comprise a diesel engine 44 connected to the shaft of the motor 15 by means of a suitable clutch 45. A separate control circuit (not shown) may be incorporated in the system to provide for engagement of the clutch 45 in the event of a power failure. The circuit adopted for this purpose should be relatively rapid-acting so that the clutch 45 will be engaged promptly upon the failure of the external power source, thereby permitting the flywheel action of the rotating parts of the system to turn the diesel engine 44 over and start it promptly. As will be apparent from the detailed operating description set forth hereinafter, the frequency control system 10 is independent of the kind of prime mover utilized for the generator 11, and the control system works the same regardless of whether the electric motor 15 is driving the generator or the diesel engine 44 is operating as the prime mover.

In the overall operation of the frequency control system 10, the motor 15 is energized and starts to rotate the output shaft 17, rotating the generator 11 through the driving connection afforded by the differential transmission 19 and the input shaft 21. At the outset, the control system 10 has no effect upon operation of the generator since it is not within the general control range of the system.

As the motor 15 nears its normal operating speed, the transmission 19 tends to drive the generator 11 at a speed above the rated speed of the generator, producing an output signal at the terminals 12–14 that exceeds the desired frequency. That is, the variable transmission 19 tends to drive the generator 11 above its rated speed when the motor 15 is operating at near its rated speed. It is the function of the system 10 to control operation of the variable transmission 19 and maintain the speed of the generator 11 within predetermined limits.

As noted above, the output from the generator 11 is utilized in the circuit 31 to produce a nominal one hundred-eighty cycle pulse signal that is shaped in the squaring amplifier 32 and supplied to the converter 33. One output signal developed in the converter is a D.C. signal having an amplitude proportional to the frequency of the input signal. This output from the converter is supplied to the amplifier 34, is amplified, and is applied to the servo valve winding 25. The valve 24 is normally biased open by a bias signal supplied to the winding 26. When the output signal from the converter 33 reaches a predetermined level, the signal supplied to the servo valve solenoid 25 starts to close the valve, affording a restriction in the hydraulic line supplied by the fixed displacement pump 22. In this manner, the pump 22 is effectively loaded and, in turn, loads the variable differential transmission 19. The additional load on the transmission 19 tends to reduce the output speed of the shaft 21, and thus reduces the frequency of the output from the generator 11. It is thus seen that the circuits 31–34 afford a main control for the frequency of the generator 11 by controlling the servo valve 24 and the operation of the pump 22.

The control afforded by the converter 33 on a direct basis, as described above, is not accurate enough for many applications, such as communication relay stations and the like. Consequently, the frequency control system 10 includes a separate "fine" or trim control which operates in conjunction with the basic or coarse control afforded directly by the converter 33 and its connection to the amplifier 34.

Thus, the A.C. output signal from the converter 33 is applied to the amplifiers 36 and 39, in series. The two amplifiers 36 and 39 are quite selective in their operating characteristics. These two circuits, explained in detail hereinafter in connection with FIGS. 6 and 7, combine to produce an output signal that is somewhat amplitude dependent with respect to the input signal frequency and which is shifted in phase by an amount representative of deviations of the input signal frequency from the desired standard. This output signal is shaped in the squaring amplifier 42 and is supplied to the discriminator 37 together with the original output signal from the converter 33. The discriminator 37 functions as a phase discriminating circuit and produces an output signal that, in effect, varies in amplitude and polarity depending on changes in phase of the two applied signals, and, accordingly, upon changes in output frequency of the generator 11. The signal from the discriminator 37 is supplied to the servo amplifier 34 through coupling circuit 38 and affords a fine control for the servo valve amplifier 34. More particularly, the discriminator 37 operates over a range of the order of two percent, with respect to variations in the output signal frequency of the generator 11, and holds the generator within this control range.

In considering the specific circuits of FIGS. 2–10, the best starting point is the squaring amplifier 32 illustrated in FIG. 4. Thus, the input terminal 51 of the amplifier 32 is connected to the pulse generator 31 (see FIG. 1). The initial stage of the amplifier 32 is an A.C.-coupled emitter follower including a transistor 52 having its base electrode connected to the input terminal 51 through a coupling capacitor 53. The base electrode of the transistor 52 is also returned to system ground through a circuit comprising, in series, two resistors 54 and 55. The operating voltage level for the base electrode is established by this circuit connection and a further resistor 56 that is connected from the common terminal of the resistors 54 and 55 to a source of unidirectional operating potential designated as C—. The collector electrode of the first stage transistor 52 is connected to the C— supply. The emitter electrode is returned to ground through a load resistor 57 and is also coupled back to the base electrode through a feedback capacitor 58.

The coupling circuit from the emitter follower stage comprising the transistor 52 includes a coupling capacitor 59 connected in series with a resistor 61 from the emitter electrode of the transistor 62 to the base electrode of a second stage transistor 62. A bias control circuit is provided for the base electrode of the transistor 62, and includes three resistors 63, 64 and 65 connected in series with each other between the C— supply and ground. The resistor 65 is quite small in comparison with resistors 63 and 64 and serves as an input impedance for the second stage of the amplifier 32. The resistor 63 is also connected in series with a load resistor 66 that is connected to the collector electrode of the transistor 62, the common terminal 67 of the resistors 63, 64 and 65 being by-passed to ground by a capacitor 68. The emitter of the second stage is connected to system ground.

The limiter stage comprising the transistor 62 is followed by a third stage including a transistor 69 having its base electrode A.C. coupled to the collector of the transistor 62 by means of a coupling capacitor 71. The operating voltage for the base electrode of the transistor 69 is established by a voltage divider comprising a pair of resistors 72 and 73 connected between the C— supply and ground. The transistor 69 forms the first stage of a Schmitt trigger circuit 70 of familiar construction. Thus, the collector electrode of the transistor 69 is connected to the base electrode of a second transistor in this stage, identified by reference numeral 74, the coupling circuit comprising the parallel combination of a resistor 75 and a capacitor 76. The collector of the transistor 69 is also connected to the C— supply by a resistor 77. The emitters of the two transistors 69 and 74 are connected together and are returned to ground through a relatively small resistor 78. The base of the second transistor in this stage is returned to ground through a resistor 79. The output circuit of the trigger comprises a pair of load resistors 81 and 82 connected in series with each other from the collector of the transistor 74 to the C— supply, the actual output circuit comprising a coupling capacitor 83 that is used to couple the Schmitt trigger circuit 70 to the input of the converter 33.

The input signal from the pulse generator 31 (FIG. 1) is a unidirectional pulse signal recurring at a frequency determined by the operating speed of the generator 11. As noted above, the preferred arrangement is to afford a three-phase rectifier circuit to produce a pulse signal at the terminal 51 which would have a frequency of one hundred-eighty cycles per second, or more accurately pulses per second, when the generator is operating exactly at the desired sixty-cycle frequency. The first stage comprising the transistor 52 serves primarily as an impedance transformation stage and power amplifier. Thus, the output signal from this stage is a series of half-wave pulse signals of generally sinusoidal waveform.

The second stage 62 operates as a clipping amplifier. That is, the maximum amplitude of the output signal from this stage is limited so that the tops of the incoming sinusoidal-shaped pulse signals are effectively clipped, and the resulting generally flat-topped pulse signals are supplied to the Schmitt trigger 70 through the coupling capacitor 71.

The operation of the Schmitt trigger circuit 70 is generally familiar in the art. In effect, this device functions as a one-shot multi-vibrator and produces output signals of substantially rectilinear waveform at the operating frequency of the input pulse signal supplied to the transistor 69. Thus, on each input pulse signal the normally cut-off transistor 74 is driven conductive for a short interval, producing an output pulse signal that is applied to the next stage through the coupling capacitor 83. The duration of the pulse is determined primarily by the parallel RC circuit 75–76, which restores the transistor 74 to its normal non-conductive condition and at the same time returns the transistor 69, which is cut off by the input pulse signal, to its original conductive condition.

The converter 33 comprises an input transistor 85 connected in a simple amplifier circuit, the collector electrode of the transistor being grounded and the base electrode being connected to the coupling capacitor 83. The emitter electrode of the transistor 85 is connected back to the base electrode by a feedback resistor 86 to afford good switching characteristics, the resistor also serving as a bias setting resistor. The emitter electrode is also connected to the C— supply through a circuit comprising, in series, the resistors 87 and 88. The resistor 87 couples the emitter of the transistor 85 to the base electrode of a second switching transistor 89 that is over-driven from cut-off to saturation to afford a square-wave output. The emitter electrode of the transistor 89 is connected directly to the C— supply. The collector, on the other hand, affords an output electrode for the device that is coupled to several different circuits. Thus, the collector of the transistor 89 is coupled directly to the input terminal 91 of the trigger 37 (see FIG. 10). The collector is also connected to a voltage divider comprising two resistors 92 and 93 that are in series with each other, the second resistor 93 being connected to a positive-polarity D.C. source B+. The common terminal 94 between the two resistors affords the input terminal for the amplifier 36 of FIG. 6.

In addition, there is one further output circuit 96 connected to the collector electrode of the transistor 89. The circuit 96 comprises a coupling capacitor 97 connected in series with a diode 98 between the collector electrode of the transistor 89 and a first input terminal 99 (see FIG. 3) of the servo valve amplifier 34. A second diode 101 is connected from the common terminal of the capacitor 97 and the diode 98 to system ground. A capacitor 102, on the other hand, is connected from the output terminal 99 to ground.

The converter 33 receives a signal of substantially rectangular waveform having an amplitude that is substantially constant and a frequency determined by the output of the generator 11 (FIG. 1). The converter serves primarily to amplify this pulse signal, preserving its generally rectangular configuration in the pulse signals supplied to the discriminator 37 at the terminal 91 and to the amplifier circuit 36 at the terminal 94. The integrating output circuit 96, on the other hand, produces a signal at the terminal 99 that is unidirectional in polarity, due to the location and orientation of the diodes 98 and 101, and having an amplitude proportional to the frequency of the input signal. This latter characteristic in the output signal appearing at the terminal 99 is effected by utilizing a relatively small capacitor as the capacitor 97 and a very much larger capacitor for the shunt capacitor 102. In effect, therefore, the circuit 96 is a rather simple but effective digital-to-analog converter circuit that develops an output signal, a D.C. voltage, having an amplitude proportional to the frequency of the input signal. Of course, the output appearing at the terminal 99 is not a completely steady-state D.C. signal, but includes a low-amplitude ripple frequency signal, but this does not disturb the basic operation of the device.

The servo valve amplifier 34 is shown in detail in FIG. 3. The first stage of this amplifier comprises a transistor 104 that is connected by a first input resistor 105 to the terminal 99 that connects the servo valve amplifier to the converter circuit 33 (FIG. 5). The base electrode of the transistor 104 is also connected to a biasing circuit by means of a resistor 106, the other terminal of the resistor 106 comprising the adjustable tap on a variable resistor 107. In addition to the adjustable resistor 107, the biasing circuit includes two additional resistors 108 and 109 connected in series with the resistor 107 between the B+ supply and ground.

The transistor 104 is connected in a grounded-emitter configuration with a self-biasing resistor 111 connected between the emitter electrode and ground. The collector electrode is connected through a load resistor 112 to the C— supply. The collector electrode is also connected to the base electrode of a switching transistor 113. The emitter of the switching transistor 113 is returned to ground through a resistor 114 and the collector is connected to one end of the main solenoid valve winding 25. The other end of the winding 25 is connected directly to the C— supply.

In addition to functioning as a switching transistor, the final stage comprising the transistor 113 affords a source of negative feedback signals for the input stage comprising the transistor 104. Thus, the emitter electrode of the transistor 113 is connected back to the base electrode of the transistor 104 by a series circuit comprising a resistor 115 and a potentiometer 116. The potentiometer 116 affords a means for adjusting the overall gain of the servo valve amplifier and thus affords a speed control reference 43 for the system (see FIG. 1). In addition, there is a compensating circuit connected in parallel with the speed control reference circuit. In this instance, the compensator comprises a capacitor 117 connected in series with a resistor 118, this series combination being connected from the emitter electrode of the transistor 113 back to the base electrode of the transistor 104.

The amplifier 34 also includes an adjustable temperature compensating circuit for the base-collector circuit of the transistor 104. A resistor 119 is connected from the collector electrode of the transistor 104 back to the base electrode. A variable tap on this resistor is connected to the collector of a power amplifier transistor 121. The emitter of the transistor 121 is connected to a positive-polarity D.C. supply, designated as E+, by means of a resistor 122. The base electrode is connected to the E+ supply through a resistor 123.

As explained above, the incoming signal supplied to the input terminal 99 of the servo valve amplifier 34 is a variable D.C. signal, the amplitude thereof being proportional to the frequency of the output from the generator 11 (FIG. 1). This D.C. signal is amplified in the input circuit comprising the transistor 104 and is supplied to the output stage comprising the transistor 113. Thus, the amplified signal is employed to energize the solenoid 25 at a level dependent upon the instantaneous operating frequency of the generator. To avoid "hunting," the servo valve amplifier is stabilized by the negative feedback afforded by the circuits connecting the emitter of the transistor 113 back to the base or input electrode of the transistor 104. The gain of the amplifier may be adjusted by adjustment of the potentiometer 116. The initial conduction level of the transistor 104 may be adjusted by adjustment of the potentiometer 107. The total current to the solenoid 25 can also be varied by adjustment of the potentiometer 119, to compensate for thermal changes in the operation of the circuit. This makes it possible to calibrate the servo valve amplifier accurately for the desired frequency output.

The circuits comprising FIGS. 3, 4 and 5 afford a basic frequency control for the generator 11. That is, the amplifier 32, the converter 33, and the servo valve amplifier 34 cooperate with each other, and with the pulse generator 31, to actuate the servo valve 24 and increase the loading on the pump 22 each time the generator 11 tends to operate above rated speed and to decrease the loading when the generator tends to operate below rated speed. In fact, this portion of the system can maintain the output of the generator within a relatively narrow frequency range of perhaps two to three cycles per second. This is not adequate, however, for applications with which the present invention is intended to be used. Accordingly, to meet the stringent requirements of such applications, the fine control system described generally hereinabove is incorporated in the frequency control apparatus.

The initial stage in the fine control system is the amplifier 36, which is illustrated in FIG. 6. The input terminal 94 of the amplifier 36 is coupled by a capacitor 131 to the base electrode of a transistor 132. The operating potential for the base electrode of the transistor 132 is established by a voltage divider comprising a pair of resistors 133 and 134 connected between the B+ supply and system ground, the base electrode being connected to the common terminal of the two resistors. The emitter electrode of the transistor 131 is returned to ground through a resistor 135 which also serves as the ground return resistor for the collector of a second transistor 136. The collector of the transistor 132 is connected to the B+ supply through a load resistor 137 and is also directly connected to the base electrode of an output transistor 138. The output transistor 138 is connected in an emitter-follower circuit with the collector connected to the B+ supply and the emitter returned to ground through a pair of load resistors 139 and 141 connected in series with each other.

As noted hereinabove, the amplifier 36 is highly selective with respect to frequency, the frequency selection being accomplished by a control circuit that modifies a negative feedback path within the amplifier. The feedback arrangement includes a twin-T filter 142 having input and output terminals 143 and 144, respectively, and a common terminal 145. The input terminal 143 of the filter is connected to the emitter of the output transistor 138. The common terminal 145 is returned to ground and the output terminal 144 is connected to the base electrode of a feedback amplifier comprising a transistor 146. The transistor 146 is connected in an emitter-follower circuit with the collector electrode connected to the B+ supply and the emitter electrode returned to ground through a load resistor 147. The emitter electrode is also connected to the base electrode of the transistor 136. The emitter of the transistor 136, on the other hand, is connected to the B+ supply through a circuit comprising two resistors 148 and 149 in series with each other, the resistor 149 being by-passed for high frequencies by a capacitor 151.

FIG. 6A illustrates, in detail, a typical filter circuit that may be utilized for the filter 142 in FIG. 6 and which may equally well be employed for the corresponding filter in FIG. 7. The circuit 142 comprises a resistor 161, a potentiometer 162, a potentiometer 163, and a resistor 164 connected in series with each other between the input terminal 143 and the output terminal 144. The variable taps for the potentiometers 162 and 163 are ganged and are electrically connected to the common terminal at the center of the filter. A pair of capacitors 165 and 166 are connected in series with each other and in parallel with the four resistive elements 161–164 between the terminals 143 and 144.

A capacitor 167 is connected from the center terminal of the resistive portion of the filter to ground. The common terminal of the two capacitors 165 and 166, on the other hand, is returned to ground through two series-connected potentiometers 168 and 169. The potentiometer 168 is ganged with the two potentiometers 162 and 163.

The basic operation of the filter circuit 142 is well known in the art; accordingly, only a brief description is required. This circuit is essentially a notch filter which affords a relatively low attenuation at all frequencies except for a single relatively narrow band centered about a given design frequency. That is, this is the reverse of a band-pass filter with a quite sharply defined transmission band, the attenuation at the frequency to which the filter is adjusted being quite high. Moreover, the filter affords a phase shift that is proportional to frequency variations. Calibration of the filter is effected by simultaneous adjustment of the three potentiometers 162, 163 and 168, which are preferably ganged for this purpose. The additional potentiometer 169 affords a fine or trimming adjustment.

In considering the operation of the filter amplifier of FIG. 6, it should be remembered that the input signal appearing at the terminal 94, which is derived from the converter circuit 33 (FIG. 5) is of substantially constant amplitude and has a frequency proportional to the output frequency of the generator 11. This is a signal of substantially rectangular waveform, as applied to the base electrode of the input transistor 132. The input signal is amplified in the circuit comprising the transistor 132 and is applied to the base electrode of the transistor 138. The transistor 138 is essentially a power amplifier and produces an output signal that, with respect to waveform, is approximately the same as the input signal.

The variation in the output signal from the final stage of the circuit 36, as compared with the input signal, is effected by the negative feedback circuit comprising the filter 142 and the two transistor stages including the devices 146 and 136. As noted above, the filter 142 is essentially a notch filter. It affords very high attenuation at a sharply defined frequency $f_c$ and little or no attenuation at other frequencies, and a pronounced phase shift at the same frequency $f_c$, as shown in FIG. 6B. Thus, when the signal being translated through the amplifier 36 is at a frequency different from the center frequency $f_c$ of the filter 142, attenuation in the negative feedback path is quite low, with the result that a substantial negative feedback signal is supplied to the initial stage comprising the transistor 132. Accordingly, the overall gain of the amplifier 36 is relatively low for any such signal that is displaced in frequency by any substantial amount from the center frequency of the twin-T filter 142. On the other hand, the twin-T filter affords high attenuation at the selected frequency $f_c$ for which it has been constructed, with the result that the gain of the amplifier 36 is relatively high at the design frequency of the filter. Because of the sharply defined filter characteristics of the circuit 142, the differential in signal levels appearing at the output terminal 153 is quite marked, despite relatively small variations from the design frequency of the filter 142, which in this instance would be one hundred-eighty cycles per second. Moreover, the output signals are phase-shifted in proportion to frequency variations in the input signal relative to the center frequency $f_c$ (FIG. 6B).

FIG. 7 illustrates the second filter amplifier 39. This amplifier is essentially the same as the amplifier 36 and comprises a coupling capacitor 154 that couples the output terminal 153 of the amplifier 36 to the base electrode of a first transistor 155 that corresponds to the initial transistor 132 in the circuit of FIG. 6. The filter amplifier 39 further includes an output stage comprising a transistor 156 and a feedback circuit from the transistor 156 to the transistor 155. As before, the feedback arrangement is a negative feedback circuit and includes a twin-T filter 157, a transistor 158 connected in an emitter-follower stage, and a further transistor 159 incorporated in the circuit coupling the feedback path to the emitter of the transistor 155. Because the circuits 36 and 39 are essentially identical in construction, and may use corresponding components, there is no need to re-describe the exact details of the amplifier. The circuit 39 is incorporated in the system solely to afford a finer and more accurate control, with respect to frequency, by, in effect, cascading the two twin-T filters 142 and 157 to afford more sharply defined frequency-selection characteristics.

FIG. 8 illustrates the on-speed indicator circuit 41. This device comprises a coupling circuit 171 which is essentially a rectifying circuit. The circuit 171 is electrically connected to the output terminal 172 of the second of the two filter amplifiers, the circuits 39 (see FIG. 7), and is connected by a resistor 173 to the base electrode of a transistor 174 connected in a gate circuit. The base electrode of the transistor 174 is returned to ground through a potentiometer 175. The emitter of the transistor is grounded and the collector is connected to the C— supply through a circuit comprising, in series, a transistor 176 and the operating coil 177 of a relay 178. The contacts of the relay 178 may be connected to suitable external circuits such as indicator lamps or other monitoring devices, as desired.

The circuit 171 rectifies the output signal from the amplifier 39 to develop a control signal for the gate 174. Due to the sharp frequency selective characteristics of the amplifiers 36 and 39, the output voltage of the converter circuit as applied to the base electrode of the transistor 174 is a direct function of the frequency of the input signal. The potentiometer 175 is adjusted to render the gate transistor 174 conductive approximately at the input frequency corresponding to the desired operating frequency for the generator 11 (FIG. 1). In the described system, this would be at one hundred-eighty cycles per second for the input signal to the circuit 41. The circuit 41 affords a close indication as to whether the system is operating at the desired frequency, and also affords a positive indication that the fine control circuitry is in operating order and should be effective to hold the generator to the desired output frequency.

FIG. 9 illustrates in substantial detail the next circuit in sequence in the fine control portion of the system, the squaring amplifier 42. In many respects, the amplifier 42 is substantially identical with the squaring amplifier 32 described hereinabove in connection with FIG. 4. Thus, the input connection from the terminal 172, which corresponds to the output terminal of the preceding circuit 39, is the same as in the circuit 32. The initial stage comprises a transistor 182 connected in a circuit that may be identical with the operating circuit for the transistor 52 in the circuit of FIG. 4. To avoid needless repetition, the individual connections for the transistors 182 and 183 are not described in detail herein.

The third stage of the squaring amplifier 42 comprises a Schmitt trigger circuit 190 that is identical with the circuit 70 of FIG. 4 except for the input circuit to the initial transistor 189 of the circuit. As before, the base electrode of the input transistor 189 for the trigger circuit is coupled by a capacitor 191 to the collector of the preceding stage comprising the transistor 183. Moreover, the capacitor 191 may be of the same value as the corresponding capacitor 76 in the circuit of FIG. 4. However, the base electrode of the transistor 189 is also connected to a potentiometer 192, one terminal of which is grounded, the other terminal of the potentiometer being connected to the C— supply through a resistor 193. An additional connection to the base electrode of the transistor is provided in the form of a coupling circuit 194 that comprises an input capacitor 195 connected in series with a diode 196 and a resistor 197 between the input terminal 172 of the amplifier and the base electrode of the transistor 189. The common terminal of the capacitor 195 and the diode 196 is returned to ground through a diode 198 and the common terminal of the diode 196 and the resistor 197 is returned to ground through a capacitor 199.

The input signal appearing at the terminal 172 is, of course, a unidirectional pulse signal recurring at a frequency determined by the operating frequency of the generator 11, in this instance at approximately one hundred-eighty cycles per second. The initial stage comprising the transistor 182 affords an impedance transformation and power amplification. The second stage of the amplifier operates as a clipper or limiter, producing somewhat flat, tipped output signal pulses. The Schmitt trigger 190, on the other hand, operates as before to produce a substantially square wave output signal at the terminal 201. The only difference in operation, as compared with the circuit of FIG. 4, is provided by the incorporation of the circuit 194 in the amplifier. This circuit produces a substantially steady-state D.C. signal, at the base electrode of the transistor 189, having an amplitude proportional to that of the input signal. In effect, this circuit maintains the transistor 189 in its initial non-conducting state until such time as the input signal amplitude approaches a value indicative of a frequency of one hundred-eighty cycles, based on the correlation between frequency and amplitude in the output from amplifier 39 as explained above. In this manner, the circuit 194 effectively disables the amplifier circuit 42 until the output from the generator approaches sixty cycles per second. This arrangement is employed to prevent a "hunting" operation in the fine control portion of the frequency regulating system, at the time of starting up of the generator or at any time when the generator drops to a speed substantially below that necessary to maintain a sixty-cycle output.

The discriminator 37 illustrated in FIG. 10 compares the output of the converter 33 with the output of the squaring amplifier 42 to develop a signal indicative of even very minor variations of the operating frequency of the generator 11 from the desired standard. The initial stage comprises a bi-stable flip-flop circuit 210 including a pair of transistors 211 and 212. The emitters of the two transistors are connected to system ground through a common resistor 213. The collector electrodes of the transistors 211 and 212 are connected to the C— supply through the resistors 215 and 216 respectively. The collector of the transistor 211 is connected to the base of the transistor 212 through a parallel RC circuit comprising a resistor 217 and a capacitor 219. Similarly, the collector of the transistor 212 is connected to the base of the transistor 211 by means of a resistor 218 and a parallel capacitor 220.

The input circuit to the first transistor 211 of the multi-vibrator 210 comprises a coupling capacitor 221 that is connected to the output terminal 91 of the converter 33 (FIG. 5), being connected through a diode 222 to the base electrode of the transistor 211. The common terminal of the capacitor 221 and the diode 222 is returned to ground through a resistor 223 and the base electrode of the transistor 211 is connected to ground through a resistor 224. A similar input or steering circuit is provided for the transistor 212 and comprises a coupling capacitor 225, a coupling diode 226, and the resistors 227 and 228.

The output from the flip-flop circuit 210 is taken at the collector of the transistor 212, although it could also be taken from the collector of the transistor 211. In any event, the output connection is made to the base electrodes of two transistors 231 and 232 that are connected in parallel amplifier stages. The collector of the two transistors are connected to the C— supply and the emitters of the two transistors are returned to ground through equal load resistors 233 and 234. The output circuit for the transistor amplifier 231 comprises a coupling capacitor 235 connected to the emitter, and the series combination of a diode 236 and a resistor 237. The common terminal of the capacitor 235 and the diode 236 is connected to ground through a diode 238.

The output circuit of the transistor 232 is identical with the output circuit of the transistor 231 except that the two diodes in the circuit are reversed in polarity. Thus, the output circuit for the second amplifier stage 232 comprises the coupling capacitor 239, the diode 241, and the resistor 242 all connected in series with each other, the common terminal of the capacitor 239 and the diode 241 being returned to ground through the diode 243. The output resistors 237 and 242 are connected together at the terminal 245 and a potentiometer 246 is connected in series with this terminal and the output terminal 247 of the discriminator circuit, which is coupled back to the coupler circuit 38 of FIG. 2.

FIG. 11 presents a simple and graphic explanation of the operation of the discriminator circuit 37 of FIG. 10. FIG. 11 presents three specific signal examples A, B and C pertaining to different possible signal conditions for different output frequencies from the generator 11 (FIG. 1).

Example A in FIG. 11 shows the signal conditions where the generator is running at rated speed and produces an exact sixty-cycle output signal. Under these conditions, the signal supplied to the discriminator 37 at the terminal 91, which is derived from the converter 33 of FIG. 5, is a substantially rectangular waveform of constant frequency, illustrated by the waveform 391A. The signal at the terminal 201 is at the same frequency, of course, but is exactly 180° out of phase with respect to the signal 391A. This second input signal is identified in FIG. 11 by the reference character 401A. In any given operating cycle of the multi-vibrator 210, one of the transistors 211 and 212 is driven conductive by the leading edge of each cycle of its associated input signal, at which time the other transistor is driven to cut off. Consequently, and since the leading edges of the two signal waves 391A and 401A are displaced exactly 180° with respect to each other, the signal appearing at the output terminal 248 of the flip-flop circuit is a symmetrical rectangular wave as indicated by the waveform 402A in FIG. 11. This square-wave signal is rectified and averaged in the output circuits of the two amplifiers 231 and 232, with the result that the signal appearing at the terminal 247 is essentially constant. This particular constant voltage is the reference for the system and indicates exact operation of the generator at the desired frequency.

Example B in FIG. 11 illustrates the change in conditions that occurs when the generator exceeds the desired operating speed by even a small amount. The signal appearing at the terminal 91 remains essentially unchanged, although its frequency is of course slightly higher. This signal is indicated in Example B in FIG. 11 by the waveform 391B. The signal 401B appearing at the terminal 201 is also the same with respect to waveform but is displaced in phase, due to the action of the filter amplifiers 36 and 39 as explained hereinabove. As a consequence, the times at which the transistors 211 and 212 are triggered to conduction are not in balance, as they were before, so that the output signal appearing at the terminal 248 is now of the form illustrated by the waveform 402B. By inspection, it is apparent that this signal has an average negative value, relative to the average of the signal 402A produced when the generator was operating at the exact design speed. Accordingly, a negative-going signal variation occurs at the output terminal 247 of the discriminator.

Example C in FIG. 11 shows that the exact reverse condition occurs when the generator slows down and produces an output signal that is below the design frequency by even a small amount. Thus, in this instance the waveform 391C for the signal at the terminal 91 remains essentially unchanged. The signal 401C appearing at the terminal 201 is essentially unchanged in form but is now retarded in phase, relative to the signal 391C. That is, the low speed example of section C of FIG. 11 shows a phase retardation as compared with phase advancement that occurs on a high speed condition, example B in FIG. 11.

Of course, the result is a change in polarity in the average of the output signal 402C from the multi-vibrator. It is thus seen that the output signal at the terminal 247 of the discriminator 37 is a D.C. signal of variable amplitude varying in relative polarity and amplitude with changes in speed of the controlled generator. It can be demonstrated that this is an essentially linear relationship and that control can be maintained within a range of two percent or less with respect to the rated frequency.

To complete the individual operating circuits, there remains only the coupling circuit 38 of FIG. 2, which interconnects the discriminator 37 with the servo valve amplifier 34. The circuit 38 comprises an amplifier including a transistor 251 connected in an emitter-follower configuration. The collector electrode of the transistor 251 is connected to the C— supply through a resistor 252. The emitter electrode is returned to the B+ supply through the series combination of a load resistor 253 and a bias resistor 254. The base of the transistor 251 is connected to the input terminal 247 that corresponds to the output terminal of the discriminator 37. The base electrode is also connected to a biasing circuit comprising a resistor 255 that is connected through the resistor 252 to the C— supply and a resistor 256 that is returned through the resistor 254 to the B+ supply.

There is usually some one hundred-eighty cycle ripple associated with the output signal from the discriminator 37. For this reason it is desirable to incorporate a filter and regulator circuit in the coupling circuit 38 of FIG. 2. The filter and regulation circuit comprises a resistor 258 that is connected from the input terminal 247 to ground, this resistor being by-passed by two series-connected capacitors 259. The remainder of the circuit illustrated in FIG. 2, to the left of the resistor 258, is employed for voltage regulation purposes, and accordingly, is not described in detail herein. In the preferred arrangement, coupler circuit 38, with its voltage regulation components, including the Zener diodes 249, the capacitors 250, and the resistors 252 and 254, comprises the source of the auxiliary voltages E+ and F— as indicated in the drawing.

Essentially, the coupler 38 functions as an impedance matching and power amplifier stage. The emitter of the transistor 251 is coupled through a resistor 261 to the base electrode of the input transistor 104 in the servo valve amplifier 34. The signal applied to the servo valve amplifier operates in the same manner as the signal supplied to the terminal 99 of the amplifier, direct from the converter 33, to control the operation of the servo valve 24, thereby controlling the loading of the pump 22 to vary the transmission ratio of the device 19 (FIG. 1).

As noted hereinabove, the system illustrated in FIG. 1 utilizes the servo valve 24, the pump 22, and the differential transmission 19 to afford a means for obtaining accurate continuous control of the speed of the generator 11. The pump may be of conventional construction. A preferred construction for the valve 24 is that set forth in Patent No. 2,884,907 to Raymond Atchley. One example of a device that may be employed as the differential transmission 19 is illustrated in longitudinal sectional view in FIG. 12. The device 19 illustrated in FIG. 12 is a step-up transmission housed within a rotating gear case 301, the gearing being of the kind identified as a compound epicyclic system. The rotating gear casing 301 is grooved to accept the V belts 23, and comprises the output of the differential that drives the hydraulic pump 22 (FIG. 1). The rotatable housing is mounted on two large ball bearings 302 and 303. The bearing 302 engages an input hub 304 whereas the bearing 303 engages an output hub 305.

Within the housing 301, there are a plurality of helical planet gear assemblies each consisting of two gears of appropriate size splined to the common shaft. Typically, three such assemblies may be used, but only one spline assembly 306 is shown in detail in the drawing. The axial thrust of the shaft 307 is absorbed by balls 308 and 309 in conical sockets at either end of the shaft, these ball members 308 and 309 engaging nylon plugs in the rotating gear casing assembly 301.

The first gear 311 on the spline shaft assembly 306 engages a sun gear 312 affixed to the input hub 304. The other gear 313 of the assembly 306 matches with a sun gear 314 secured to the output hub 305. The hub 305 is mounted on needle bearings and is telescoped over the adjacent hub 304.

Power is transmitted from the input shaft 321 secured to the hub 304, through the differential action between the planet assemblies and the sun gears, to both the output hub 305 and the rotating gear case assembly 301. If the assembly 301 is permitted to rotate freely, a relatively high order step-up in speed is obtained at the output shaft 322, due to the relative sizes of the planetary gears. However, if the combination output member and casing 301 is effectively loaded to any substantial extent, the step-up ratio is reduced. Of course, it is necessary to work out a suitable correlation between the loading of the rotating housing 301, by the hydraulic pump 22, and the desired output speed for the generator 11 (see FIG. 1). However, this is not too difficult, particularly in a null-seeking system of the kind described hereinabove, which tends automatically to compensate for any variations in speed regardless of direction and amount.

In order to afford a more complete description of one working embodiment of the invention, certain circuit data are set forth hereinafter with regard to the devices of FIGS. 2–10. It should be understood that these data are furnished solely by way of illustration and in no sense as a limitation on the invention.

*Resistors and potentiometers*

| | | |
|---|---|---|
| 119, 255, 256 | megohms | 1 |
| 116 | kilohms | 500 |
| 82 | do | 180 |
| 72, 112 | do | 150 |
| 54, 64, 115, 133, 134, 193 | do | 100 |
| 55, 56, 197 | do | 56 |
| 122, 123 | do | 47 |
| 63 | do | 33 |
| 73, 75 | do | 18 |
| 223, 227 | do | 15 |
| 57, 61, 66, 261, 106, 137, 147, 173, 175, 192, 237, 246, 253 | kilohms | 10 |
| 224, 217, 218, 228 | do | 8.2 |
| 86, 109 | do | 6.8 |
| 87 | do | 3.9 |
| 105 | do | 3.3 |
| 79 | do | 2.7 |
| 65, 233 | do | 2.2 |
| 107 | do | 2 |
| 77, 81, 139 | do | 1.8 |
| 108, 135, 215, 216 | do | 1.5 |
| 88, 149 | do | 1 |
| 92 | ohms | 680 |
| 141 | do | 560 |
| 78, 94, 114, 176 | do | 470 |
| 148, 213 | do | 100 |
| 111 | do | 10 |

*Operating voltages*

| | | |
|---|---|---|
| B+ | volts | +25 |
| C— | do | —25 |
| E+ | do | +10 |
| F— | do | —10 |

*Capacitors*

| | | |
|---|---|---|
| 259 | microfarads | 400 |
| 151 | do | 200 |
| 58, 102 | do | 100 |
| 59, 83 | do | 50 |
| 71 | do | 20 |
| 68 | do | 10 |
| 131, 199, 235, 239 | do | 1 |

| | | |
|---|---|---|
| 97, 195 | do | 0.22 |
| 221, 225 | do | 0.001 |
| 76, 219, 220, 250 | micromicrofarads | 200 |

*Semi-conductor devices*

| | |
|---|---|
| 52, 104, 113, 121, 132, 146 | 2N1309 |
| 62, 69, 74, 211, 212 | 2N396 |
| 85 | TI495 |
| 89 | 2N1701 |
| 98, 101 | CER-70 |
| 136 | 2N1308 |
| 138 | 2N586 |
| 222, 226, 236, 238, 241, 243 | 1N1692 |
| 231, 232 | 2N43A |
| 249 | 1N1523 |

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. A frequency-control system for A.C. generating apparatus comprising a prime mover and an A.C. generator, said system comprising: a variable-ratio transmission connecting the prime mover in mechanical driving relation to the A.C. generator, said transmission being effective to drive said A.C. generator above its rated speed when said prime mover operates at its rated speed, said transmission including speed-modifying means for modifying the input-output speed ratio thereof; control means for the speed-modifying means of said transmission, including at least one electrically actuatable control device; converter means, coupled to said A.C. generator, for developing a first actuating signal representative of gross variations in the frequency of the output of said generator relative to a given standard; a null-seeking fine control circuit comprising at least one phase-shifting circuit and a phase discriminator coupled to said A.C. generator, for developing a second actuating signal representative of fine variations in the frequency of the output of said generator; and means coupling said converter means and said null-seeking fine control circuit to said control device to modify the speed ratio of said transmission in response to variations in the output signal frequency of the A.C. generator and thereby stabilize the output signal frequency at said standard.

2. A frequency-control system for A.C. generating apparatus comprising a prime mover and an A.C. generator, said system comprising: a variable-ratio transmission connecting the prime mover in mechanical driving relation to the A.C. generator and to a hydraulic pump, said transmission being effective to drive said A.C. generator above its rated speed when said prime mover operates at its rated speed, and with no load imposed thereon by the pump, but affording a progressive reduction in output speed in response to loading by said pump; control means, comprising an electrically actuated servo valve, for controllably loading said pump; converter means, coupled to said A.C. generator, for developing a first D.C. actuating signal having an amplitude proportional to gross variations of the output frequency of said generator from a given standard; a null-seeking fine control circuit means for generating a second actuating signal proportional to minute variations of the output frequency of the generator from said standard; and means, comprising an adding amplifier, coupling said converter means and control circuit means to said servo valve to modify the loading of said pump in response to both of said actuating signals and thereby stabilize the output signal frequency of said generator at said standard.

3. In a frequency-control system for an A.C. generator including an electrically actuated speed adjustment apparatus, circuit means for actuating said speed adjustment apparatus comprising: input means, connected to said generator, for developing an initial control signal having a frequency proportional to the generator output frequency; analog converter means, connected to said input means, for developing a first continuously variable actuating signal having an amplitude directly proportional to the frequency of said initial control signal; narrow-band frequency-selection means connected to said input means for developing a second control signal having a frequency equal to said initial control signal but shifted in phase through an angle proportional to variations of said initial control signal from a selected normal frequency; phase discriminator means coupled to said frequency-selection means and to said input means for developing a second continuously variable actuating signal proportional in amplitude to the frequency of said initial control signal; and means connected to said converter means and to said discriminator means, for actuating said speed adjustment apparatus conjointly in response to said actuating signals.

4. In a frequency-control system for an A.C. generator including an electrically actuated speed adjustment apparatus, circuit means for actuating said speed adjustment apparatus comprising: input means, connected to said generator, for developing an initial control signal having a frequency proportional to the generator output frequency; analog converter means, connected to said input means, for developing a first continuously variable actuating signal having an amplitude directly proportional to the frequency of said initial control signal; narrow-band frequency-selection means connected to said input means for developing a second control signal having a frequency equal to said initial control signal but shifted in phase through an angle proportional to variations of said initial control signal from a selected normal frequency, said frequency-selection means including at least one solid-state amplifier with a twin-T notch filter connected in a negative feedback path therein, said filter having a high-attenuation frequency corresponding to said standard frequency; phase discriminator means coupled to said frequency-selection means and to said input means for developing a second continuously variable actuating signal proportional in amplitude to the frequency of said initial control signal; and means connected to said converter means and to said discriminator means, for actuating said speed adjustment apparatus conjointly in response to said actuating signals.

5. In a frequency-control system for an A.C. generator including an electrically actuated speed adjustment apparatus, circuit means for actuating said speed adjustment apparatus comprising: input means, connected to said generator, for developing an initial control signal having a frequency proportonal to the generator output frequency; analog converter means, connected to said input means, for developing a first continuously variable actuating signal having an amplitude directly proportional to the frequency of said initial control signal; narrow-band frequency-selection means connected to said input means for developing a second control signal having a frequency equal to said initial control signal but shifted in phase through an angle proportional to any variation of said inital control signal from a selected normal frequency; phase discriminator means coupled to said frequency-selection means and to said input means for developing a second continuously variable D.C. actuating signal having an amplitude proportional to variations in the frequency of said initial control signal from said normal frequency and a polarity representative of the sense of said variations and actuating means connected to said converter means and to said discriminator means, for actuating said speed adjustment apparatus conjointly in response to said actuating signals, said actuating means comprising an amplifier for adding said first and second actuating signals together to develop a composite actuation signal representative of both.

6. A frequency-control system for A.C. generating apparatus comprising a prime mover and an A.C. generator, said system comprising: a variable-ratio transmission connecting the prime mover in mechanical driving relation to the A.C. generator, said transmission being effective to drive said A.C. generator above its rated speed when said prime mover operates at its rated speed, said transmission including speed-modifying means for modifying the input-output speed ratio thereof; control means for the speed-modifying means of said transmission, including an electrically actuated speed adjustment apparatus; input means connected to said generator, for developing an initial control signal having a frequency proportional to the generator output frequency; analog converter means, connected to said input means, for developing a first continuously variable actuating signal having an amplitude directly proportional to the frequency of said initial control signal; narrow-band frequency-selection means connected to said input means for developing a second control signal having a frequency equal to said initial control signal but shifted in phase through an angle proportional to any variation of said initial control signal from a selected normal frequency; phase discriminator means coupled to said frequency-selection means and to said input means for developing a second continuously variable actuating signal proportional in amplitude to the frequency of said initial control signal; and means, connecting said converter means and said discriminator means to said speed adjustment apparatus, for actuating said speed adjustment apparatus conjointly in response to both said actuating signals.

References Cited by the Examiner
UNITED STATES PATENTS

| | | | |
|---|---|---|---|
| 2,798,997 | 7/57 | Curtis | 322—32 |
| 2,866,150 | 12/58 | Lewis | 322—40 |

LLOYD McCOLLUM, *Primary Examiner.*

ROBERT C. SIMS, *Examiner.*